United States Patent
Kopera (10) Patent No.: US 8,264,205 B2
(45) Date of Patent: Sep. 11, 2012

(54) CIRCUIT FOR CHARGE AND/OR DISCHARGE PROTECTION IN AN ENERGY-STORAGE DEVICE

(75) Inventor: John Joseph Christopher Kopera, Vail, AZ (US)

(73) Assignee: Sion Power Corporation, Tucson, AZ (US)

(*) Notice: Subject to any disclaimer, the term of this patent is extended or adjusted under 35 U.S.C. 154(b) by 548 days.

(21) Appl. No.: 12/069,335

(22) Filed: Feb. 8, 2008

(65) Prior Publication Data
US 2009/0200986 A1 Aug. 13, 2009

(51) Int. Cl.
*H02J 7/00* (2006.01)
(52) U.S. Cl. .......................................... 320/136
(58) Field of Classification Search .................... 320/136
See application file for complete search history.

(56) References Cited

U.S. PATENT DOCUMENTS

| | | | |
|---|---|---|---|
| 5,278,000 A | 1/1994 | Huang et al. | |
| 5,539,299 A * | 7/1996 | Fernandez et al. | 320/163 |
| 5,776,627 A | 7/1998 | Mao et al. | |
| 5,818,201 A | 10/1998 | Stockstad et al. | |
| 5,909,103 A | 6/1999 | Williams | |
| 5,949,218 A | 9/1999 | Colles et al. | |
| 5,952,815 A | 9/1999 | Rouillard et al. | |
| 6,001,497 A | 12/1999 | Okutoh | |
| 6,033,797 A | 3/2000 | Mao et al. | |
| 6,046,576 A | 4/2000 | Jiang | |
| 6,074,777 A | 6/2000 | Reimers et al. | |
| 6,310,463 B1 | 10/2001 | Nagaoka et al. | |
| 6,524,739 B1 | 2/2003 | Iwaizono et al. | |
| 6,577,105 B1 | 6/2003 | Iwaizono | |
| 6,603,286 B2 | 8/2003 | Herrmann et al. | |
| 6,784,642 B2 | 8/2004 | Yugo et al. | |
| 6,940,256 B2 | 9/2005 | Sakurai | |
| 7,085,338 B2 | 8/2006 | Huelss | |
| 2001/0054880 A1* | 12/2001 | Haraguchi et al. | 320/134 |
| 2005/0077878 A1* | 4/2005 | Carrier et al. | 320/134 |
| 2005/0127879 A1* | 6/2005 | Sato et al. | 320/134 |
| 2005/0156574 A1 | 7/2005 | Sato et al. | |
| 2005/0208345 A1 | 9/2005 | Yoon et al. | |
| 2007/0126403 A1 | 6/2007 | Chen | |
| 2007/0128505 A9 | 6/2007 | Yahnker et al. | |
| 2007/0152637 A1 | 7/2007 | Cherng et al. | |
| 2008/0018304 A1* | 1/2008 | Litingtun et al. | 320/134 |

FOREIGN PATENT DOCUMENTS

EP 1339154 8/2003

(Continued)

OTHER PUBLICATIONS

International Search Report and Written Opinion from PCT/US2009/000783, mailed Aug. 21, 2009.

*Primary Examiner* — Arun Williams
(74) *Attorney, Agent, or Firm* — Wolf, Greenfield & Sacks, P.C.

(57) ABSTRACT

A method and apparatus for protecting an energy-storage device (ESD), such as a rechargeable battery, is provided. A protective circuit protects an ESD from adverse charging and loading conditions including overcharging, overdischarging, charging at an excessive rate and discharging at an excessive rate. The protective circuit selectively disables charging and discharging based on the present terminal conditions. A plurality of ESDs and protective circuits can be interconnected to protect a multi-cell ESD device. Embodiments of the protective circuit are adapted to protect a lithium cell operating around 2 volts. The protective circuit may also protect the ESD from adverse temperature conditions.

23 Claims, 8 Drawing Sheets

FOREIGN PATENT DOCUMENTS

| | | |
|---|---|---|
| EP | 1 507 306 A1 | 2/2005 |
| GB | 2 433 359 A | 6/2007 |
| JP | 07023532 A | 1/1995 |
| JP | 2000-152516 | 5/2000 |
| JP | 2003-282153 | 10/2003 |
| JP | 2005-130664 | 5/2005 |

* cited by examiner

CIRCUIT FOR CHARGE AND/OR DISCHARGE PROTECTION IN AN ENERGY-STORAGE DEVICE

BACKGROUND

The present invention relates to a circuit and method for protecting an energy-storage device.

Energy-storage devices (ESDs) are used in numerous applications, particularly in portable electronic devices. A variety of types of ESDs have been developed to meet the energy density and power density requirements of various applications. These types include conventional batteries, fuel cells, conventional capacitors, and ultracapacitors.

In many applications, it is desirable to be able to recharge an ESD. Recharging the ESD places the device back in a state from which it can continue to power electronic devices, even after its stored energy has been used. Examples of rechargeable energy-storage devices include lead acid, nickel cadmium (NiCd), lithium polymer (Li-poly), lithium iron phosphate, lithium ion (Li-ion), and nickel-metal hydride (NiMH) batteries.

ESDs may be damaged if operated under extreme conditions. Either improper charging or discharging conditions may lead to damage of an ESD. Operation at excessive temperatures may also cause damage. For example, overcharging may cause electrolytic decomposition of a lithium-based rechargeable battery. Over discharging caused by a short circuit across the ESD may cause a large current to be drawn from the ESD, causing damage to the ESD. For some ESDs, even excessive discharging under normal loading conditions, resulting in a slow drop of the energy stored in the ESD, may deplete the ESD below a level at which it can be fully recharged. Operation of an ESD at an excessive temperature may also damage the ESD or be a signal of excessive load, which, in turn, may damage the ESD.

To protect an ESD during adverse operating conditions, protective circuits have been used to prevent adverse charging, discharging or temperature conditions from impacting the ESD.

SUMMARY

An improved apparatus and method are provided for protecting an energy-storage device (ESD) during adverse conditions.

In some aspects, the invention relates to a protective circuit having a charge protection circuit and discharge protection circuit. The charge protection circuit disables current flow into the energy-storage device while simultaneously allowing current to flow out of the energy-storage device while a voltage corresponding to an overcharge state of the energy-storage device is detected. The discharge protection circuit allows current to flow into the energy-storage device but disables current flow out of the energy-storage device when a voltage corresponding to an overdischarge state of the energy-storage device is detected. Current flow out of the energy-storage device is disabled until a voltage corresponding to an operating range of the energy-storage device is detected, at which point current is again allowed to flow both into or out of the energy-storage device.

In some embodiments, the protective circuit includes a p-channel FET. The p-channel FET may be adapted to disable current flow out of the energy-storage device. In addition to a p-channel FET, the protective circuit may also include an n-channel FET adapted to disable current flow into the energy-storage device.

In some embodiments, the energy-storage device is a rechargeable battery cell such as a lithium cell. The protective circuit may be adapted to protect a cell or battery having an operating range from 1.50 to 2.5 volts. The overcharge state is entered when the voltage exceeds 1.65 V and the overdischarge sate is entered when the voltage falls below 1.40 V.

In another aspect, the invention relates to a plurality of energy-storage devices and a plurality of protective circuits. Each of the plurality of energy-storage devices has a corresponding protective circuit. A first terminal of the energy-storage device is coupled to a first terminal of the protective circuit. Similarly, a second terminal of the energy-storage device is coupled to a second terminal of the protective circuit. The protective circuit further comprises a third terminal and fourth terminal. A first directional element is coupled between the first and third terminals of the protective circuit and is configured to allow current to flow in a first direction between the first terminal and the third terminal. A first switch is coupled between the first and third terminals in parallel with the first directional element. The first switch has a control input and is adapted and configured to selectively block current flow in response to a value in a first state at the control input of the first switch. An overdischarge detector is coupled between the third and fourth terminals of the protective circuit. The overdischarge detector has an output coupled to the control input of the first switch. The output of the overdischarge detector has a value in the first state when the voltage at the input of the overdischarge detector drops below a value corresponding to an overdischarge state and a value other than in the first state when the voltage rises to a level corresponding to an operating range. A second directional element is coupled between the second and fourth terminals of the protective circuit and is configured to allow current to flow in a second direction between the second terminal and the fourth terminal. A second switch is coupled between the second and fourth terminals in parallel with the second direction element. The second switch has a control input and selectively blocks current flow in response to a value in a second state at the control input of the second switch. An overcharge detector is coupled between the second and fourth terminals of the protective circuit. The overcharge detector has an output coupled to the control input of the second switch. The output of the overcharge detector has a value in the second state when the voltage at the input of the overcharge detector increases above a value corresponding to an overcharge state.

Some embodiments further comprise an over-temperature detector coupled to the control input of the first switch and the control input of the second switch. The over-temperature detector provides a value in the first state to the control input of the first switch and a value in the second state to the control input of the second switch when the temperature is outside an acceptable range.

In some embodiments, the protective circuit includes a p-channel FET. In addition to a p-channel FET, the protective circuit may also include an n-channel FET adapted to disable current flow into the energy-storage device.

In some embodiments the protective circuits are connected in parallel. In some embodiments the protective circuits are connected in series.

In some embodiments the plurality of the energy-storage devices comprise lithium cells.

Some embodiments further comprise a package. At least one of the plurality of energy-storage devices and one of the plurality of protective circuits is disposed within the package.

In a further aspect, this invention relates to a method of operating a protective circuit for an energy-storage device. The voltage applied across terminals coupled to an energy storage device is sensed. Current flow into the energy-storage device is disabled and current flow out of the energy-storage device is allowed when a voltage corresponding to an overcharge state of the energy-storage device is sensed. Current flow out of the energy-storage device is disabled and current flow into the energy-storage device is allowed when a voltage corresponding to an overdischarge state is sensed.

In some embodiments, the method further comprises monitoring the temperature and disconnecting the energy-storage device when the monitored temperature is outside an allowed temperature range.

In some embodiments, disabling current flow out of the energy-storage device comprises placing a p-channel FET in a non-conductive state. In some embodiments, disabling current flow into the energy-storage device comprises placing a n-channel FET in a non-conductive state.

In some embodiments, the energy-storage device is a lithium battery. The lithium battery may have an operating range from 1.5V to 2.5V. The overcharge state may comprise voltages over 1.65 V, and the overdischarge state may comprise voltages under 1.40 V.

BRIEF DESCRIPTION OF DRAWINGS

The invention and embodiments thereof will be better understood when the following detailed description is read in conjunction with the accompanying drawing figures. In the figures, elements are not necessarily drawn to scale. In general, like elements appearing in multiple figures are identified by a like reference designation. In the drawings.

DETAILED DESCRIPTION

The inventors have appreciated that an improved protective circuit for energy-storage devices (ESDs) is desirable. A method and apparatus for protecting an ESD is provided that protects ESDs from adverse conditions and is easily adaptable to many different types of ESDs. These adverse conditions may include over-charging, over-discharging and/or over-temperature. An embodiment of the invention is a protective circuit applicable even to ESDs operating at very low voltages. For example, an embodiment provides a protective circuit that is adapted for a lithium battery having an operating range from about 1.5 to 2.5 V.

According to embodiments of the invention, a protective circuit maybe provided to selectively disable and enable charging and/or discharging based on the detection of adverse or propitious ESD terminal conditions. Additionally, the protective circuit may include circuitry for enabling or disabling ESD charging and/or discharging based on the temperature of the ESD.

The protective circuit may include an overcharge detector for detecting a voltage corresponding to an overcharge state. A voltage corresponding to an overcharge state may occur, for example, if the ESD is charging at an excessive rate or excessively charged. The overcharge detector may control a circuit having a charging enabled mode and a charging disabled mode. While in the charging enabled mode, a charging current is permitted to reach the ESD. By changing to the charging disabled mode in response to a detected over-charge condition, damage caused by over-charging may be prevented. While in the charging disabled mode, the ESD may not receive a substantial charging current.

The protective circuit may include an overdischarge detector for detecting a voltage corresponding to an overdischarge state. A voltage corresponding to an overdischarge state may occur, for example, if the ESD is discharging at an excessive rate or is excessively discharged. The overdischarge detector may control a circuit having a discharging enabled mode and a discharging disabled mode. While in the discharging enabled mode, a discharging current is permitted to be drawn from the ESD. While in the discharging disabled mode, the ESD may not provide a substantial current. By changing the mode in response to a detected over-discharge condition, discharging may be disabled to prevent damage to the ESD.

Additionally the protective circuit may include a temperature detector for determining if the ESD is at a safe operating temperature. The temperature detector is able to control the circuits adapted to enable and disable charging and discharging. By changing the modes of these circuits in response to a detected over-temperature condition, both charging and discharging may be disabled to prevent operation of the ESD under temperature conditions that could damage the ESD.

Figure 1:
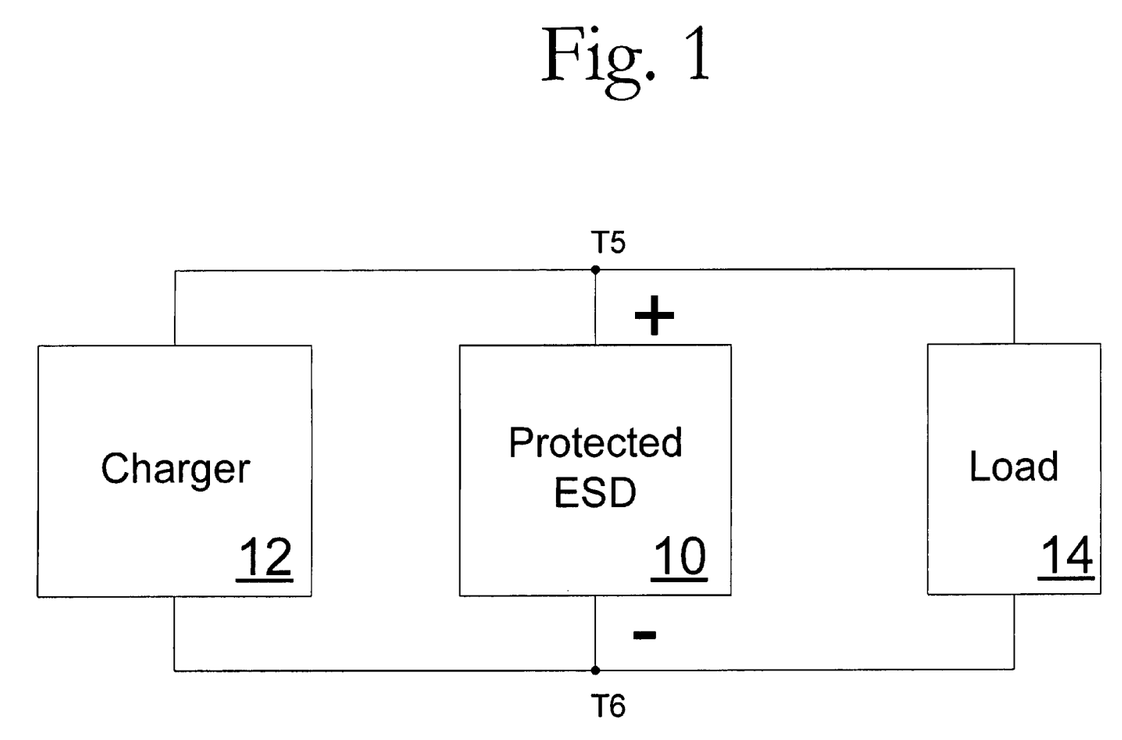
FIG. 1 is a circuit diagram showing an operating environment for an ESD with a protective circuit according to embodiments of the invention.

An example of an electronic system that may incorporate such a protective circuit is shown in FIG. 1. FIG. 1 shows an embodiment in which a protected ESD 10, a charger 12, and a load 14 are electrically connected in parallel. Protected ESD 10 has terminals T5 and T6. The charger 12 is capable of providing a charging current to the protected ESD 10 and, for example, may be a power supply connected to an AC outlet. The load 14 can represent any form of impedance. The load 14, for example, may be an electronic device.

Under normal operating conditions, the ESD will supply current to load 14 to power the load. The amount of current drawn by load 14 will be in a range that allows the ESD to maintain a voltage in the normal operating range for that ESD. Likewise, under normal operating conditions, charger 12 will supply a current at a voltage level within the normal operating range of ESD 10. However, events can occur that create adverse operating conditions. For example, the load 14 may increase the amount of current it draws from ESD 10 and cause the voltage measured by the overdischarge detector to correspond to an overdischarged state.

Also the charger 12, for example, may output spikes and irregularities in the charging voltage that may cause the voltage measured by the overcharge detector to correspond to an overcharged state.

Figure 2A:
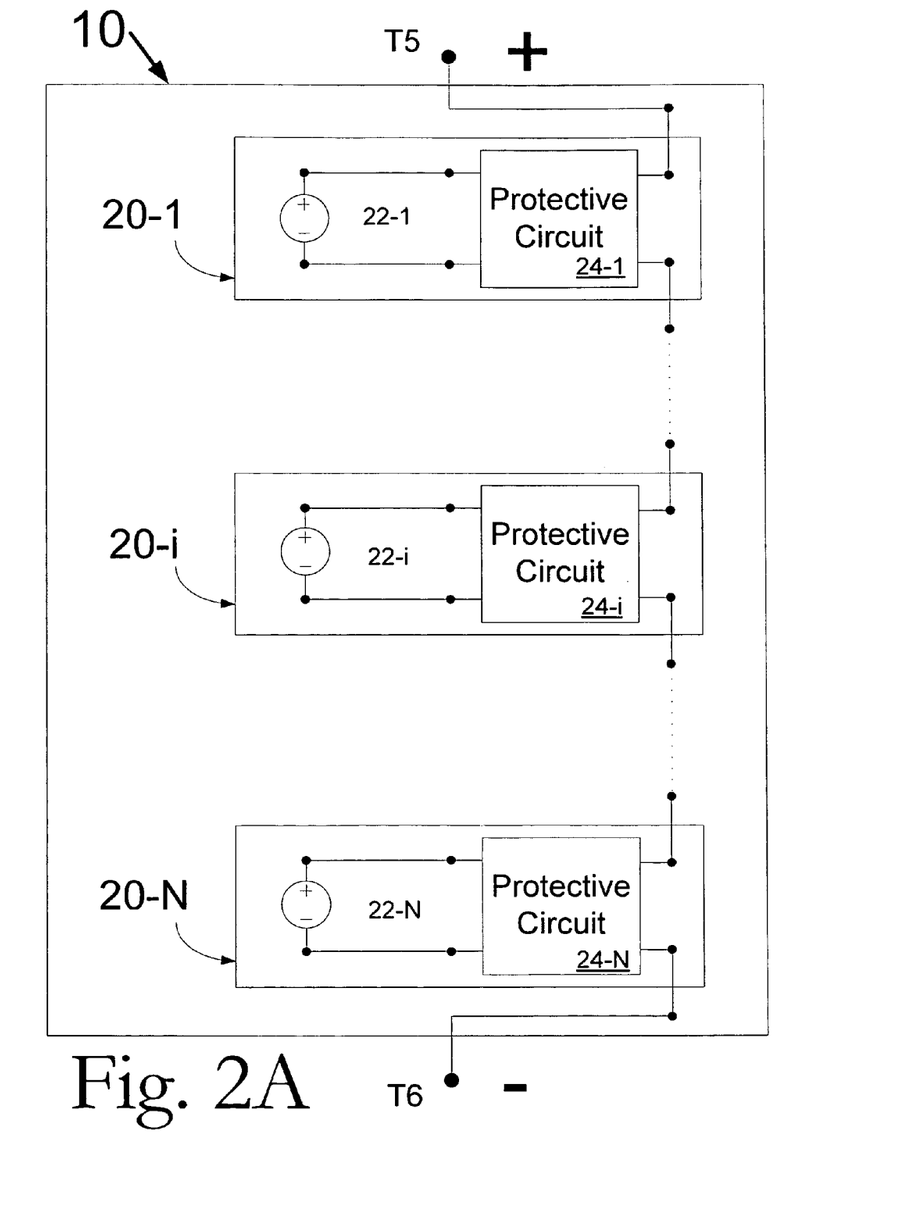
FIG. 2A is a circuit diagram showing N series connected ESDs, each with an associated protective circuit.

In some embodiments, an ESD, such as a battery may be made of multiple cells. The entire battery may be protected with a protective circuit. However, in some embodiments, each cell may have a separate protective circuit. Each protective circuit and cell may be packaged together with the cells, with associated protected circuits, may then be assembled into a multi-cell ESD. FIG. 2A is a block diagram of an embodiment of a multi-cell protected ESD 10 comprising N series connected protected ESD cell packages 20-1 to 20-N. Taking cell package 20-i as illustrative, each protected ESD cell package 20-i comprises an ESD cell 22-i and a protective circuit 24-i. The protective circuit 24-i may be implemented on a printed circuit board or other suitable substrate. The circuit board may then be attached to the ESD cell 22-i and both the protective circuit 24-i and ESD cell 22-i may be enclosed in a package. Any suitable type of packaging may be used, including shrink wrap or other material to enclose the components of the ESD cell package.

Figure 2B:
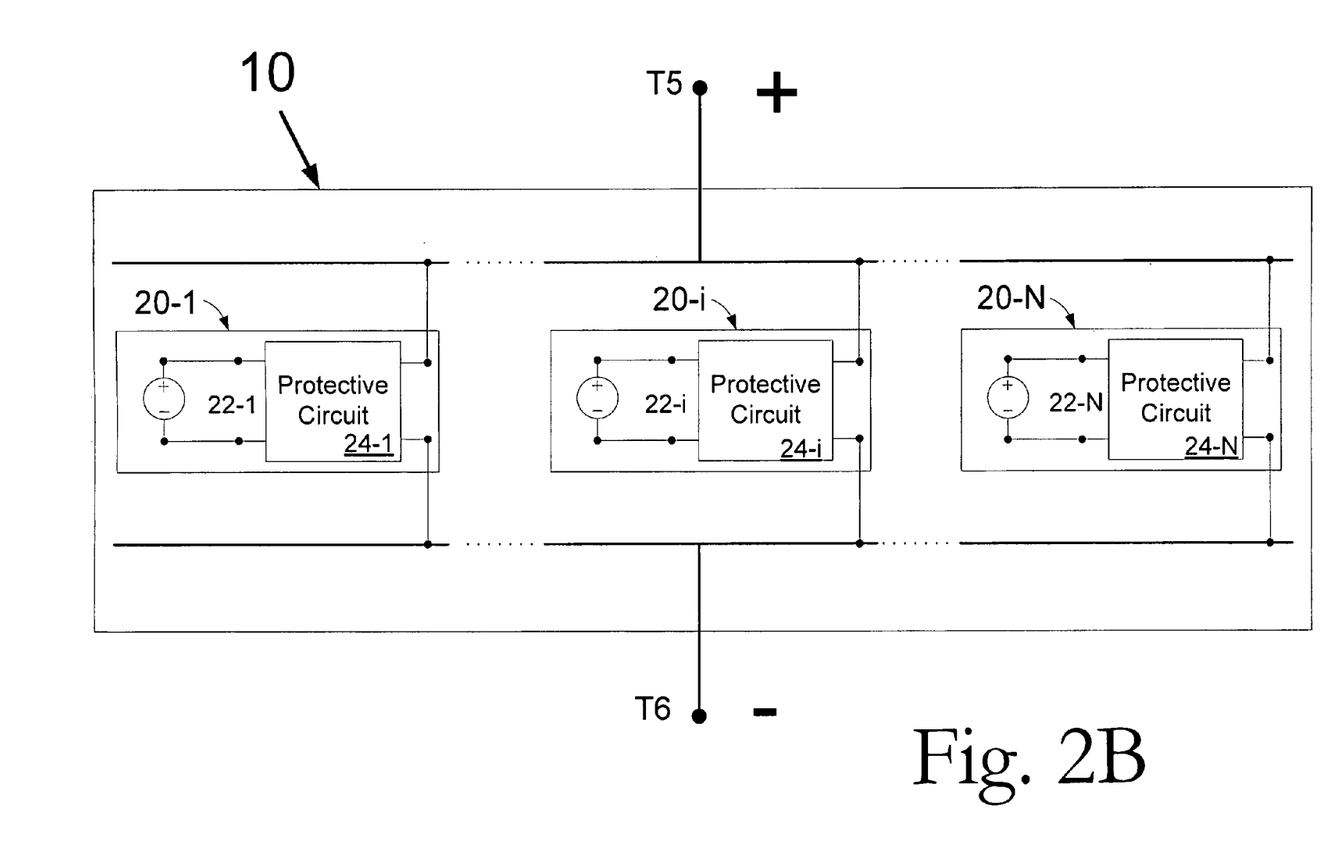
FIG. 2B is a circuit diagram showing N parallel connected ESDs, each with an associated protective circuits.

FIG. 2B is a block diagram of an embodiment of a multi-cell protected ESD 10 comprising N parallel connected protected ESD cell packages 20-1 to 20-N. The ESD cell packages 20-1 to 20-N may be implemented as in the embodiment of FIG. 2A but interconnected to form a protected ESD with different voltage and current characteristics than the ESD of FIG. 2A. Though FIGS. 2A and 2B show ESD cells connected only in series and only in parallel, embodiments are also possible wherein protected ESD 10 comprises both parallel and series connected protected ESD cells.

In the embodiments illustrated in FIGS. 2A and 2B, ESD cell 22-i may be a battery although any type of ESD may be used.

Figure 3:
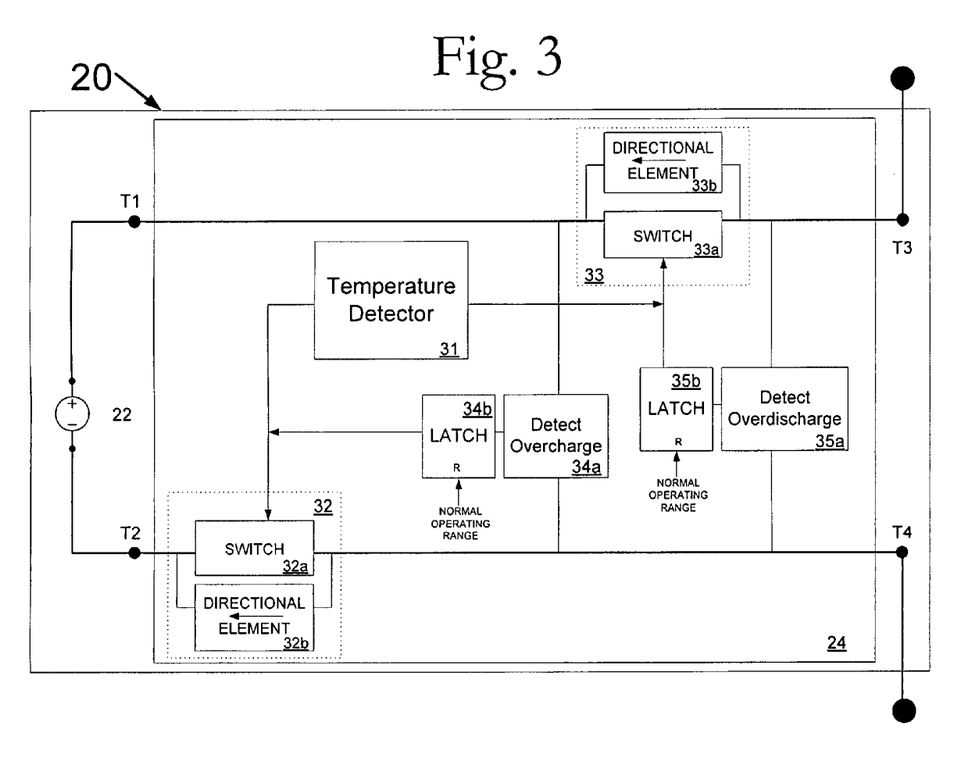
FIG. 3 is a simplified block diagram of an illustrative embodiment of the protective circuit according to some embodiments of the invention.

FIG. 3 is a block diagram of a representative protected ESD cell 20. Protected ESD cell 20 may be representative of any of the protective ESD cell packages 20-1 to 20-N in FIGS. 2A-2B. Protected ESD cell 20 comprises ESD 22 and protective circuit 24. In this example, the protective circuit 24 is a four terminal device. Terminals T1 and T2 are connected to the positive and negative terminals of ESD 22 respectively. Terminals T3 and T4 are the positive and negative connections respectively to the protected ESD cell 20. If protected ESD 10 comprised only one protected ESD cell 20, terminals T3 and T4 correspond to terminals T5 and T6 (FIG. 1), respectively, which may be connected to a load and a charger in an electric device.

The protective circuit 24 protects ESD 22 during adverse voltage conditions. Adverse voltage conditions may indicate ESD 22 is discharging at an excessive rate, charging at an excessive rate, discharged below a safe minimum energy level, or charged beyond a safe maximum energy level. The protective circuit 24 may also provide protection for the ESD 22 during adverse temperature conditions.

Under normal operating conditions, both current controllers 32 and 33 may allow current to flow freely back and forth of the terminals T1 and T2 of ESD 22. In this state, ESD 22 may either supply a current to drive a load or receive a current to recharge itself. Under adverse conditions, either or both of current controllers 32 and 33 may restrict current flow to or from ESD 22, selectively disabling charging and/or discharging of ESD 22. In the embodiment illustrated, in an overcharge state, current controller 32 prevents current from flowing from terminal T2 to terminal T4, thereby stopping charging current flow in ESD 22. During an overdischarge state, current controller 33 prevents ESD 22 from providing a current to a load by interrupting the discharge path through terminal T1 to terminal T3. During an over-temperature condition, current controllers 32 and 33 may restrict both a charging and a discharging current from reaching/leaving ESD 22.

To provide overcharge protection for ESD 22, the protective circuit 24 includes a overcharge detection circuit 34a, latch 34b and current controller 32. Current controller 32 permits current flow in two directions or in only one direction, depending on a control input. In some embodiments, current controller 32 comprises a switch 32a and a directional element 32b connected in parallel.

A control input for current controller 32 may be derived from an output of overcharge detector circuit 34a. The overcharge detection circuit 34a compares the voltage between terminals T1 and T4 to a threshold defining an overcharge state. If the voltage corresponds to an overcharged state over discharge detection circuit 34a asserts an output that sets latch 34b. Latch 34b is in turn connected to switch 32a within current controller 32. In this state, latch 34b disables switch 32a. When switch 32a is disabled, current flow is restricted through the switch. In the embodiment illustrated, when switch 32a is disabled, current flow through switch 32a is effectively blocked. However, in other embodiments, disabling switch 32a may reduce the current flow 32a to an appropriate level that reduces the risk of damage to ESD 22 through overcharging.

As shown, switch 32a is in parallel with directional element 32b. Directional element 32b permits current to flow from T4 to T2, but restricts current flow from T2 to T4. Here and throughout, currents assigned a direction are taken to flow from high potential to low potential. Thus, during an overcharge condition, current may flow from T4 to T2 allowing the ESD 22 to discharge, but not from T2 to T4, preventing further charging.

When the overcharge condition is removed, the output of overcharge detection circuit 34a will return to a state that does not set latch 34b. However, latch 34b will already be set and will remain set until a signal indicating voltage in a normal operating range for ESD 22 is present. A circuit to generate the normal operating range signal is not expressly shown in FIG. 3 for simplicity, but any suitable circuit to generate that signal may be used.

As shown, switch 32a is enabled when latch 34b is reset. Once enabled, switch 32a allows a charge current to flow into ESD cell 22. As a result, latch 34b allows protective circuit 24 to disable charging of ESD 22 in response to an overcharge condition and not re-enable charging until operating conditions return to a normal operating range. The voltage characteristic of an overcharge condition may be higher than the upper limit of the normal operating range for ESD 22.

The protective circuit 24 further includes an overdischarge detection circuit 35a, latch 35b and current controller 33 to protect ESD 22 during an overdischarge condition. Current controller 33 permits current flow in two directions or in only one direction depending on a control input. In some embodiments, current controller 33 comprises a switch 33a and a directional element 33b. The overdischarge detection circuit 35a compares the voltage between terminals T3 and T4 to a threshold defining an overdischarge state. If the voltage corresponds to an overdischarged state, over discharge detection circuit 35a outputs a value that sets latch 35b. When latch 35b is set, latch 35b disables switch 33a. When switch 33a is disabled, current flow through the switch is restricted. Switch 33a is in parallel with directional element 33b. Directional element 33b permits current to flow from T3 to T1, but restricts current flow from T1 to T3. Thus, during an overdischarge condition, current may flow from T3 to T1 allowing the ESD 22 to charge, but not from T1 to T3, preventing further discharging.

Switch 33a is enabled when latch 35b is reset. As with latch 34b, latch 35b may be reset when the voltage on ESD 22 returns to a normal operating range.

The protective circuit 24 may further comprise a temperature detector circuit 31. The temperature detector circuit 31 monitors the temperature and can disable switches 32a and/or 33a when the temperature is outside an acceptable range.

When the temperature returns to an acceptable range, the temperature detector circuit can re-enable switches 32a and/or 33a.

Figure 4:
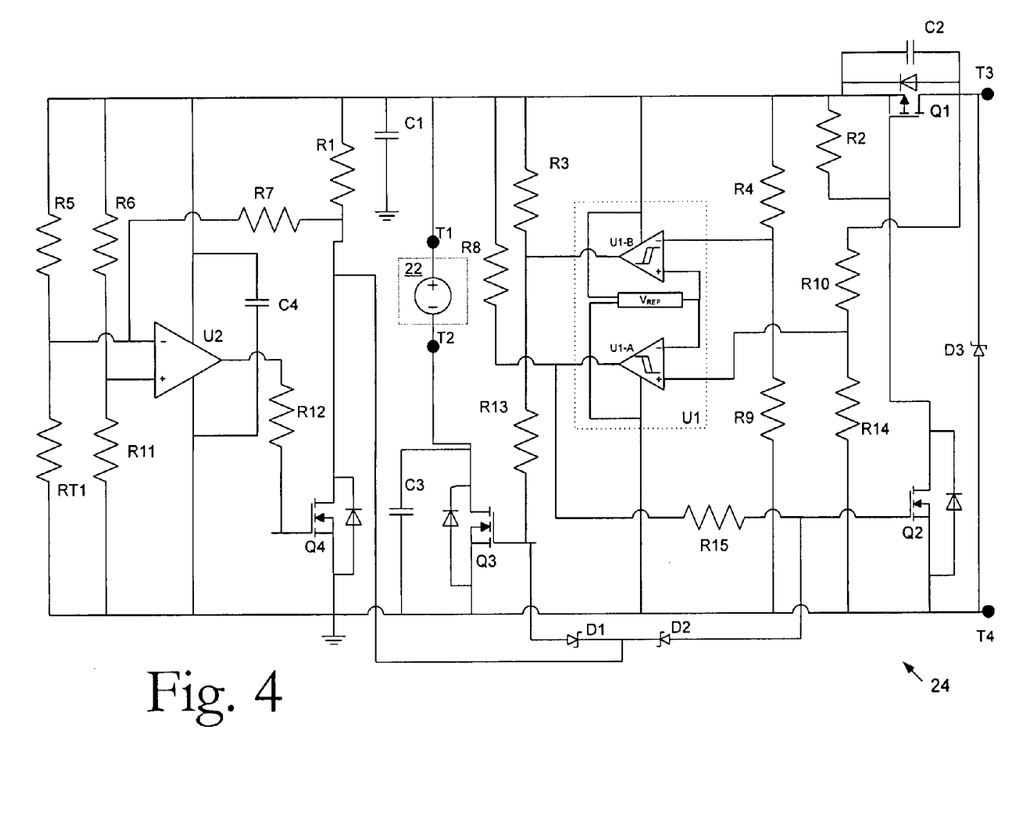
FIG. 4 is a circuit diagram of an illustrative embodiment of the invention.

The protected ESD cell 20 shown in FIG. 3 can be implemented in numerous ways. FIG. 4 is a circuit diagram illustrating an embodiment of the protective circuit 24 connected to an ESD 22. In this embodiment, the ESD 22 may be a battery having one or more cells or any type of ESD. In FIG. 4, resistors are labeled R1 to R15, capacitors are labeled C1 to C4, Schottky diodes are labeled D1 and D3, and transistors with diodes are labeled Q1 to Q4. Additionally, RT1 is a thermistor, U1 is a dual comparator integrated circuit, and U2 is an op-amp. U1 contains a reference voltage, $V_{REF}$, a first comparator, U1-A, and a second comparator, U1-B.

In this embodiment Q1 to Q4 are metal-oxide-semiconductor field-effect transistors. Q1 is a p-channel MOSFET (PMOS), and Q2, Q3, and Q4 are n-channel MOSFETs (NMOS). When a MOSFET is "ON", a current may pass with only a small voltage drop between the source and drain terminals. When a MOSFET is "OFF" the impedance between the source and drain terminals is very large and current flow between the source and drain is restricted. Each NMOS has a diode connected from its source terminal to its drain terminal. Each PMOS has a diode connected from its drain terminal to its source terminal. Each of the foregoing components is known in the art and the circuit illustrated in FIG. 4 may be constructed using such known components according to known circuit design and manufacturing techniques. Specific value of the components may be selected to enable and disable charging and discharging at voltage levels that are appropriate for ESD 22. Similarly, value may be selected to enable and disable charging and/or discharging in response to temperature levels appropriate for ESD 22. In the embodiment illustrated, transistor Q3 and its associated diode perform the functions of current controller 32. Transistor Q1 and its associated diode perform the functions of current controller 33. The functions of overdischarge detection 34a and its associated latch 34d are performed by comparator U1-D. The functions of overdischarge detection circuit 35a and its associated latch 35b are performed by comparator U1-A. The functions of temperature detector are performed by thermistor RT1 and associated components, including amplifier U2 and resistors R5, R6 and R11. Other components within the circuit of FIG. 4 perform ancillary functions, such as coupling signals between these components and ensuring that they receive voltages at an appropriate level.

During normal operation when the voltage of the ESD 22 is within the operating range and the temperature is in the acceptable range, transistor Q1, Q2, and Q3 are ON, and transistor Q4 is OFF.

When the voltage between terminals T1 and T4 corresponds to an overcharge state, the protective circuit 24 enters an overcharge protection state. This state may indicate that the ESD 22 is charging at an excessive rate or has been charged to an excessive level and is at risk of being damaged. The overcharge detection circuit 34a (FIG. 3) may include the voltage divider provided by resistors R4 and R9, which scales the voltage between terminals T1 and T4. This voltage is input to the negative terminal of comparator U1-B. During overcharge, the voltage exceeds $V_{REF}$, forcing the output of comparator U1-B low. This level in turn forces the gate electrode of NMOS transistor Q3 low, turning transistor Q3 OFF. The combination of the Q3 being OFF and the diode in parallel with transistor Q3, restricts a charging current from flowing into ESD 22 while still allowing ESD 22 to discharge.

In order for Q3 to be re-enabled, the voltage at the negative terminal of comparator U1-B must drop sufficiently to send the comparator output back to high. Notice that comparator U1-B is illustrated with a hysteresis loop. Because of the presence of hysteresis in comparator U1-B, the output switches from low to high at a different voltage than it switches from high to low. This operation provides latching that provides functionality of latch 34b (FIG. 3). It should be noted and appreciated that resistors R4 and R9, as well as $V_{REF}$ and the hysteresis properties of comparator U1-B define the overcharge state. For a given comparator and reference voltage, the overcharge state can be determined by the selection of the resistance values of R4 and R9.

When the voltage between terminals T3 and T4 corresponds to an overdischarge state, the protective circuit enters an overdischarge protection state. This state may indicate that the ESD 22 is discharging at an excessive rate or has discharged to an excessive level and is a risk of being damaged. The voltage divider provided by resistors R10 and R14 scales the voltage between terminals T3 and T4. This voltage is input to the positive terminal of comparator U1-A. During overdischarge the voltage is sufficiently below $V_{REF}$ to force the output of comparator U1-A low. This level in turn forces the gate electrode of NMOS transistor Q2 low, turning transistor Q2 OFF. In this state, a negligible current may flow across R2, and the voltage drop across R2 may be close to zero. As a result, the gate voltage of PMOS transistor Q1 becomes high, turning OFF the transistor. The combination of transistor Q1 being OFF and the diode in parallel with transistor Q1 allows a charging current to flow while at the same time restricting discharging of the ESD 22.

In order for discharging to be re-enabled, the voltage at the positive terminal of comparator U1-A must rise sufficiently to send the comparator output back to high. Notice that comparator U1-A also is shown having a hysteresis loop, again causing a memory or latching effect, which provides the functionality of latch 34a (FIG. 3). In addition, it should be noted that because Q1 has become a high impedance to current flow from T1 to T3 it has the effect of preventing the voltage of ESD 22 from re-enabling the discharge until a sufficient charging voltage is provided at the output terminals. This effect avoids the undesirable state of oscillation that may occur if a load were to remain connected between terminals T3 and T4 after an overdischarge state is detected. It should be noted and appreciated that resistors R10 and R14, as well as $V_{REF}$ and the hysteresis properties of comparator U1-A define the overdischarge state. For a given comparator and reference voltage, the overdischarge state can be determined by the selection of the resistance values of R10 and R14.

Protective circuit 24 may also provide protection during adverse temperature conditions. RT1 is a thermistor that decreases its resistance when the temperature increases. Op-amp U2 acts as a comparator between the voltage across R11 and the voltage across RT1. Resistors R6 and R11 form a voltage divider establishing the high temperature threshold that must be exceeded to disable charging and discharging of the ESD 22. When ESD 22 is operating below the temperature threshold, U2 outputs a low signal causing transistor Q4 to be OFF. When the temperature threshold is exceeded, U2 outputs a high signal and transistor Q4 turns ON. Because the source of Q4 is grounded the voltage at the node connecting the Schottky diodes D1 and D2 becomes low. This in turn forces the gates of transistor Q2 and transistor Q3 low turning transistor Q2 and transistor Q3 OFF. In turn, transistor Q1 is also turned OFF and charging and discharging of ESD 22 is disabled.

In some embodiments, an anti-parallel diode, D3, is connected between terminals T3 and T4 as shown in FIG. 4. Diode D3 may be added for operation of the protected circuit in series.

In an example embodiment of the invention using the protective circuit of FIG. 4 for a lithium battery cell having a nominal operating range from 1.5 to 2.5 V the selected resistor and capacitor values are summarized in Table 1A and Table 1B. The reference voltage, $V_{REF}$, in U1 is 400 mV.

TABLE 1A

Resistor Values for a Lithium Battery Cell Protective Circuit

| Resistor | | | | | | | | | | | | | | |
|---|---|---|---|---|---|---|---|---|---|---|---|---|---|---|
| R1 | R2 | R3 | R4 | R5 | R6 | R7 | R8 | R9 | R10 | R11 | R12 | R13 | R14 | R15 |
| MΩ 1.0 | 1.0 | 1.0 | 3.5 | 1.0 | 1.0 | 10 | 1.0 | .373 | 1.0 | .011 | .010 | .010 | .402 | .010 |

TABLE 1B

Capacitor Values for a Lithium Battery Cell Protective Circuit

| Capacitor | | | |
|---|---|---|---|
| C1 | C2 | C3 | C4 |
| µF 0.1 | .05 | 0.1 | 0.1 |

Figure 5:
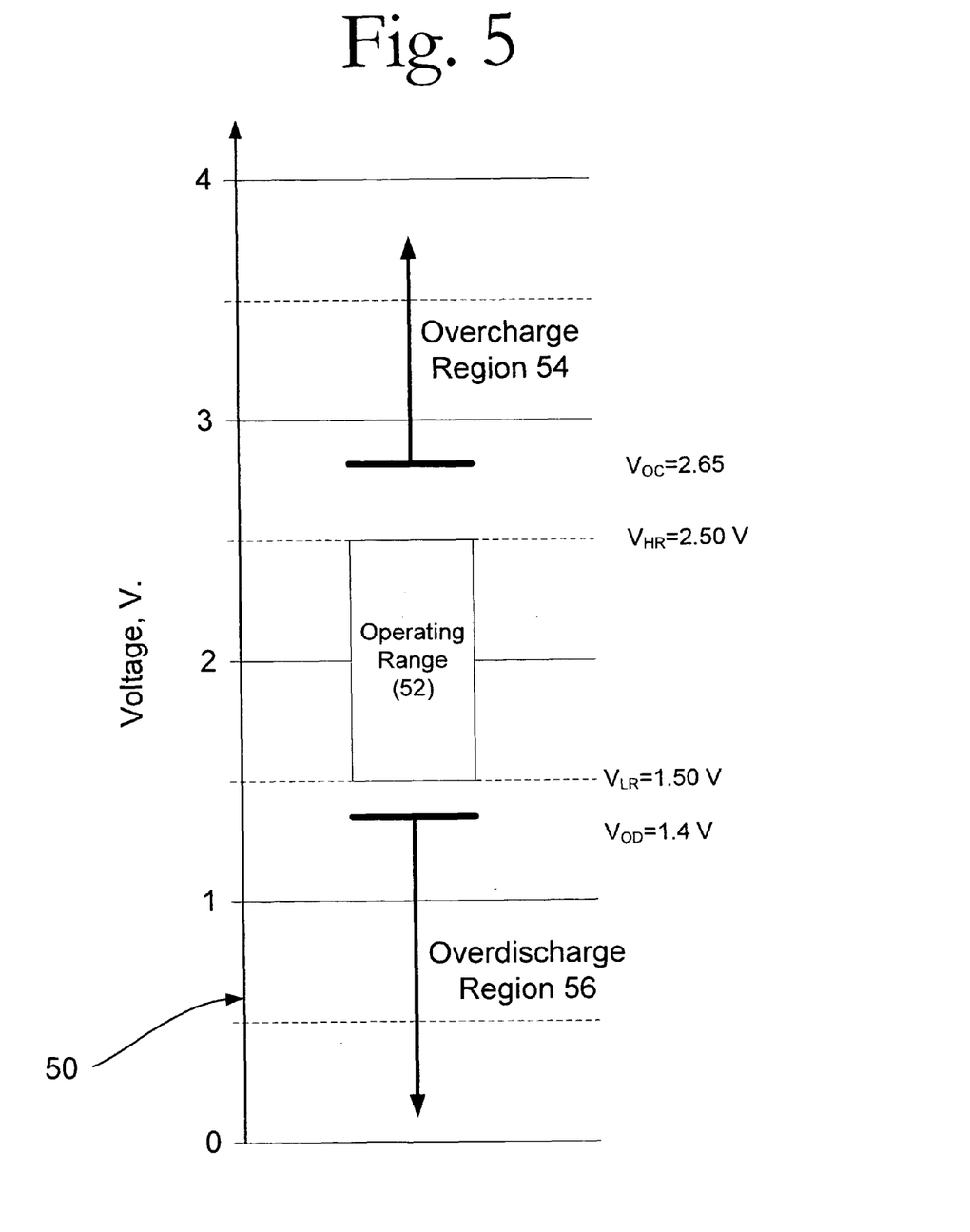
FIG. 5 is a plot of the operating voltage range, over-discharge threshold, and over-charge threshold for an illustrative embodiment of the protective circuit.

Operation of a circuit such as that illustrated in FIG. 3 creates a set of distinct voltage ranges. FIG. 5 shows a voltage plot illustrating on voltage axis 50 the operating range 52, overcharge region 54, overdischarge region 56. The specific voltages correspond to the example embodiment of a lithium battery cell protective circuit having the topology shown in FIG. 4 and the resistance and capacitance values summarized in Tables 1A and 2A respectively. The specific voltage values can be adjusted by selecting different circuit components and embodiments of the invention may be constructed for any suitable values.

The operating range 52 indicates the region of normal operation of the ESD 22. It has an upper bound of $V_{HR}$ and a lower bound of $V_{LR}$. If the voltage exceeds $V_{OC}$, the ESD is operating in the overcharge region 54. If the voltage is less than $V_{OD}$, the ESD is operating in the overdischarge region 56. Generally, $V_{OC}$ is greater than or equal to $V_{HR}$ and $V_{OD}$ is less than or equal to $V_{LR}$. In some embodiments, the difference between $V_{OC}$ and $V_{HR}$, and $V_{OD}$ and $V_{LR}$ is due to the memory, or latching effect, such as is present in comparators U1-A and U1-B in FIG. 4.

The voltage thresholds for the example embodiment of a protective circuit for a lithium battery are summarized in Table 2.

TABLE 2

Operating Range, Overcharge and Overdischarge Limits for a Lithium Battery Cell Protective Circuit

| | |
|---|---|
| $V_{OC}$ | 2.65 V |
| $V_{HR}$ | 2.50 V |
| $V_{LR}$ | 1.50 V |
| $V_{OD}$ | 1.40 V |

Figure 6:
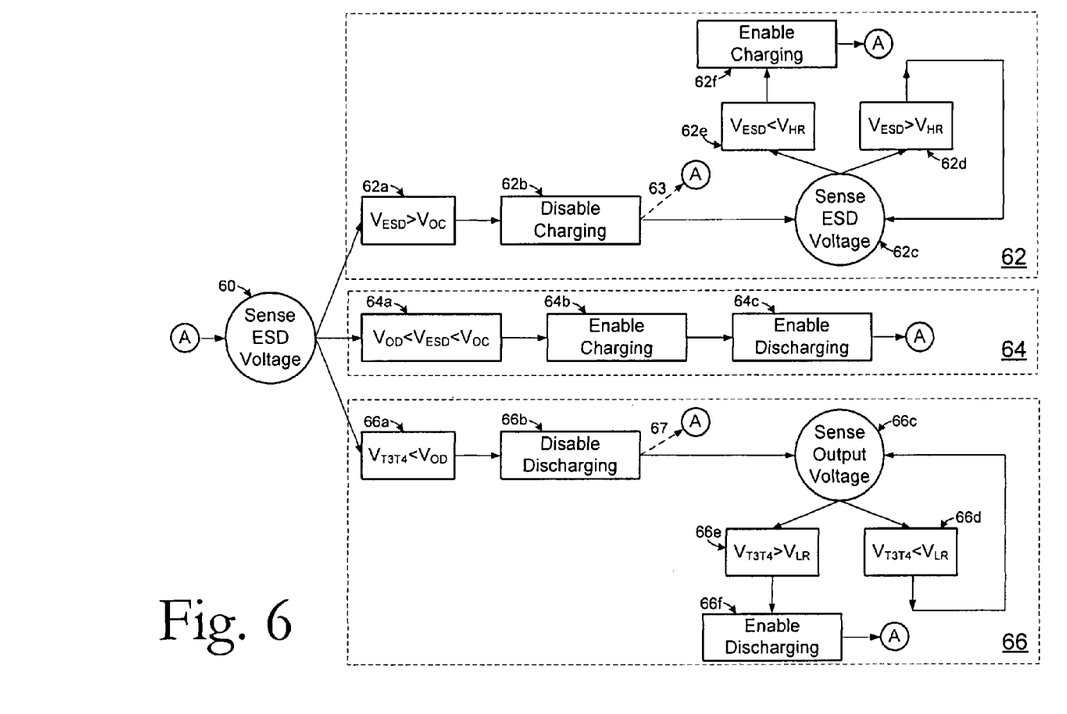
FIG. 6 is a flow chart of a process of operating a protective circuit providing over-charge and over-discharge protection according to some embodiments of the invention.

FIG. 6 illustrates a method of operating a protective circuit according to an embodiment of the invention to enable and disable charging and discharging during adverse voltage conditions. The method may be performed by the circuit of FIG. 4 or any other suitable circuit.

A voltage associate with the ESD, $V_{ESD}$, is sensed at step 60. If the ESD voltage is above $V_{OC}$, path 62 is taken. At step 62a it is recognized that the ESD voltage is in the overcharge region 54 (FIG. 5). This prompts disabling charging of the ESD (step 62b). The ESD voltage is again sensed at step 62c, where a determination is made of whether the voltage has fallen back into the operating range 52 (FIG. 5). If the ESD voltage has not returned to the operating range 52 (step 62d), the process branches to step 62c, implementing a loop in which the voltage is monitored until it does. After entering the operating range 52 (step 62e), charging is re-enabled (step 62f). The process then returns to step 60.

If the ESD voltage is below $V_{OD}$, path 66 is taken. In the embodiment of FIG. 4, the voltage measured is actually the output voltage, $V_{T3T4}$, across terminals T3 and T4, which is representative of $V_{ESD}$ during normal operation. At step 66a it is recognized that the output voltage is in the overdischarge region 56 (FIG. 5), which prompts disabling ESD discharging at step 66b. The output voltage, $V_{T3T4}$, is sensed at step 66c, where it is determined whether the voltage has returned to the operating range 52. If the output voltage, $V_{T3T4}$, has not returned to the operating range 52 (step 66d), the process branches to step 66c, implementing a loop in which the voltage is continuously monitored until it does (step 66e). After entering the operating range 52 (step 66e), discharging is re-enabled (step 66f). The process then returns to step 60.

If the ESD voltage is in between $V_{OC}$ and $V_{OD}$, that is, in the operating range 52, path 64 is taken. At step 64a it is recognized that the ESD voltage is in the operating range 52. Steps 64b and 64c reinforce that charging and discharging, respectively, are enabled when the ESD voltage is in this range.

Embodiments of the invention may provide protection for a wide variety of ESDs. For example, the voltage levels of $V_{OC}$, $V_{OD}$, $V_{HR}$, and $V_{LR}$ may be adjusted for a different ESD by changing the components used in the protective circuit In other embodiments, the overcharge region 54 and operating range 52 border each other such that $V_{OC}=V_{HR}$. In this case, subsequent step 62b flow returns to step 60 as indicted by the dashed arrow 63. Steps 62c through 62f are not implemented under this embodiment, which may be the case if, for example, comparator U1-B does not have the memory feature described above.

In other embodiments, the overdischarge region 56 and operating range 52 border each other such that $V_{OD}=V_{LR}$. In this case, subsequent to step 66b, flow returns to step 60 as indicted by the dashed arrow 67. Steps 66c through 66f are not implemented under this embodiment, which may be the case if, for example, comparator U1-A does not have the memory feature.

In yet other embodiments, the overcharge region 54 and operating range 52 border each other such that $V_{OC}=V_{HR}$, and the overdischarge region 56 and operating range 52 border each other such that $V_{OD}=V_{LR}$. In this case step 60 follows both steps 62b and 66b.

Figure 7:
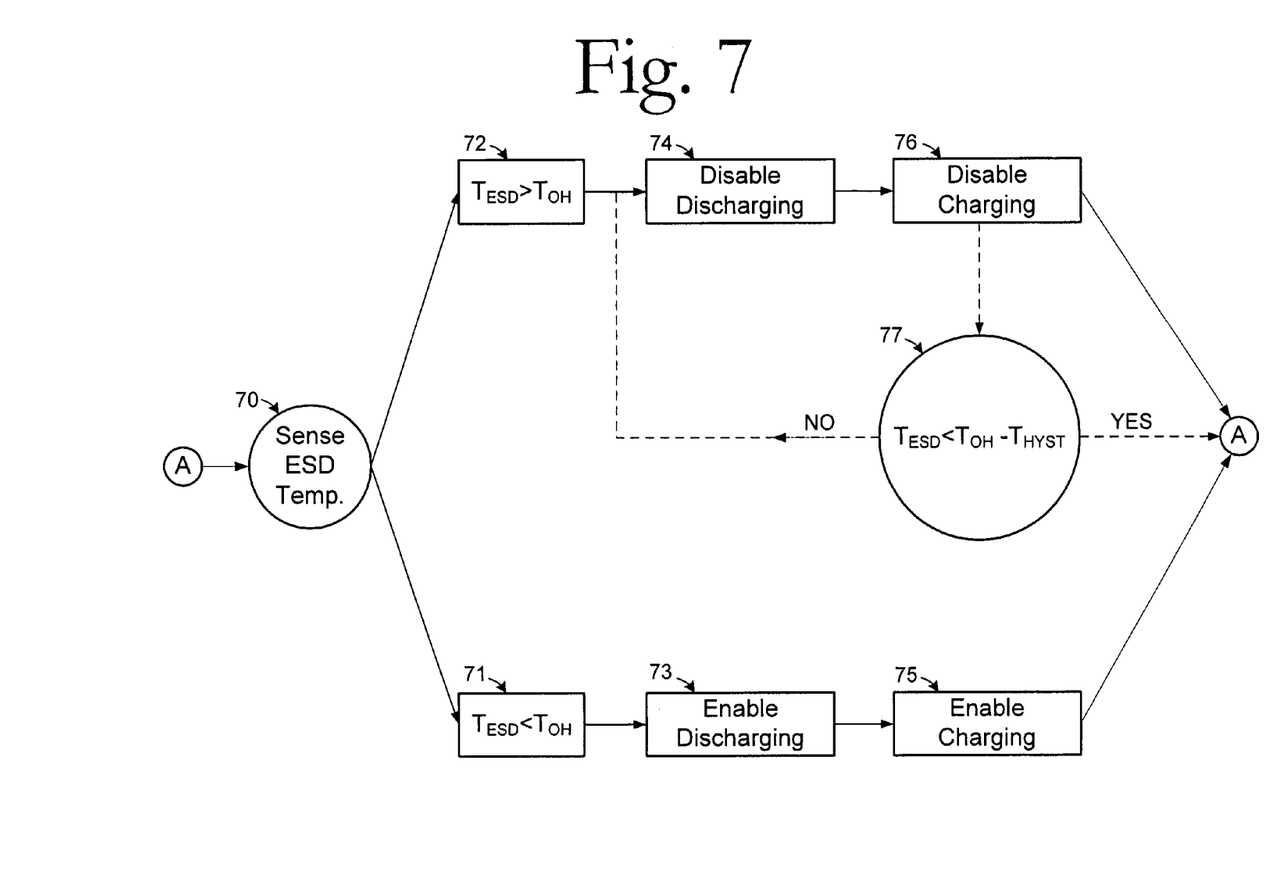
FIG. 7 is a flow chart of a process of operating a protective circuit with temperature protection according to some embodiments of the invention.

FIG. 7 illustrates a method of operating a protective circuit according to embodiments of the invention to enable and disable charging and discharging during adverse temperature conditions. The ESD temperature, $T_{ESD}$, is sensed at step 70. If the temperature exceeds a temperature threshold (step 72), $T_{OH}$, discharging (step 74) and charging (step 76) are disabled. Once disabled, hysteresis (step 77) may optionally be applied to the temperature to prevent reactivation until the temperature drops below the threshold, $T_{OH}$, plus the hysteretic value, $T_{HYST}$. If the temperature is initially below the threshold (step 71), discharging (step 73) and charging (step 75) are enabled.

Though FIGS. 6 and 7 illustrate methods for protection from adverse voltage conditions and adverse temperature conditions separately, methods of the invention may be performed simultaneously. In embodiments of the invention where both adverse temperature and voltage conditions are being simultaneously protected against, disabling steps may take precedence over enabling steps. For example, the ESD 22 temperature may be below the temperature threshold, leading to enabling steps 73 and 75, yet an adverse voltage condition may exist, causing either charging (step 62b) or discharging (step 66b) to be disabled. The disabling step may take precedence in this scenario.

Having thus described at least one illustrative embodiment of the invention, various alterations, modifications, and improvements will readily occur to those skilled in the art.

For example, it should be appreciated that practical switches may not form perfect open circuits and short circuits when in the OFF or ON state. Tolerances may exist for all components, which permit a leakage current and small voltage drop across a switch in the OFF and ON states, respectively. Moreover, in some embodiments, adequate protection for an ESD may be provided without completely blocking and charging and/or discharging current. In such embodiments, the "switches" of the protective circuit may restrict such current flows without completely blocking them.

As an example of another variation, it should be appreciated that a single protective circuit may be used to protect multiple ESDs. It should be appreciated that an embodiment of the invention may use a first reference voltage with respect to comparator U1-A and a second reference to voltage with respect to comparator U1-B, rather than a single reference voltage for both as shown in FIG. 4. In some embodiments charger 12 may be intermittently connected to protected ESD 10. In some embodiments load 14 may be intermittently connected to protected ESD 10.

It should be appreciated that proper selection of circuit components will enable protection of a wide variety of ESDs.

In some embodiments, adverse temperature protection may be extended to further protect the ESD 22 from operating under temperature conditions below a low temperature threshold. This may be implemented by using another comparator and voltage divider.

Further, FIG. 4 illustrates an embodiment in which switch 33a (FIG. 3) is implemented with a p-channel FET and switch 32a (FIG. 3) is implemented with an n-channel FET. Alternatively, switch 33a may be implemented with an n-channel FET and/or switch 33b may be implemented with a p-channel FET.

Such alterations, modifications, and improvements are intended to be within the scope of the invention. Accordingly, the foregoing description is by way of example only and is not intended as limiting. The invention is limited only as defined in the following claims and the equivalents thereto.

What is claimed is:

1. A protective circuit for an energy-storage device, comprising:
    a charge protection circuit adapted to disable current flow into the energy-storage device and allow current to flow out of the energy-storage device while a voltage corresponding to an overcharge state of the energy-storage device is detected;
    a discharge protection circuit adapted to disable current flow out of the energy-storage device when a voltage corresponding to an overdischarged state of the energy-storage device is detected until a voltage corresponding to an operating range of the energy-storage device is detected and allow current to flow into the energy-storage device while a voltage corresponding to the overdischarged state of the energy-storage device is detected;
    a first connection terminal configured for direct connection to an external load, a charger, and/or a second energy storage device;
    a second connection terminal configured for direct connection to the external load, the charger, and/or a third energy storage device; and
    an anti-parallel diode coupled between and directly connected to the first connection terminal and the second connection terminal.

2. The protective circuit of claim 1, wherein the discharge protection circuit comprises a p-channel FET.

3. The protective circuit of claim 2, wherein the p-channel FET is adapted and configured to selectively disable current flow out of the energy-storage device.

4. The protective circuit of claim 2, wherein the charge protection circuit comprises an n-channel FET adapted and configured to disable current flow into the energy-storage device.

5. The protective circuit of claim 1, wherein the discharge protection circuit comprises an n-channel FET and the charge protection circuit comprises an n-channel FET.

6. The protective circuit of claim 1, wherein the energy-storage device is a rechargeable battery.

7. The protective circuit of claim 6, wherein the operating range is between the lower bound voltage and an upper bound voltage, the lower bound voltage being 1.5 volts and the upper bound voltage being 2.5 volts.

8. The protective circuit of claim 6, wherein the voltage corresponding to the overcharged state is greater than an overcharged voltage of 2.65 volts and the overdischarged voltage is 1.40 volts.

9. The protective circuit of claim 1, in combination with a charging circuit and a rechargeable lithium battery cell wherein the protective circuit is electrically coupled between the rechargeable battery cell and the charging circuit.

10. The protective circuit of claim 1, wherein the first connection terminal is directly connected to the external load, the charger, and/or the second energy storage device.

11. The protective circuit of claim 10, wherein the second connection terminal is directly connected to the external load, the charger, and/or the third energy storage device.

12. An apparatus comprising a plurality of energy-storage devices and a plurality of protective circuits, each energy-storage device comprising a first terminal and a second terminal and each protective circuit having a first terminal and a second terminal coupled to the first terminal and the second terminal, respectively, of an energy-storage device of the plurality of energy-storage devices, each protective circuit comprising:

a third terminal configured for direct connection to an external load, a charger, and/or a second energy storage device;
a fourth terminal configured for direct connection to the external load, the charger, and/or a third energy storage device;
an anti-parallel diode coupled between and directly connected to the third terminal and the fourth terminal;
a first directional element coupled between the first terminal and the third terminal of the protective circuit adapted and configured to allow current flow in a first direction between the first terminal and the third terminal;
a first switch coupled between the first terminal and the third terminal of the protective circuit in parallel with the first directional element, the first switch having a control input, the first switch being adapted and configured to selectively block current flow in response to a value in a first state at the control input of the first switch;
an overdischarge detector having an input coupled between the third terminal and the fourth terminal of the protective circuit, the overdischarge detector having an output coupled to the control input of the first directional switch, the output of the overdischarge detector having a value in the first state when the voltage at the input of the overdischarge detector drops below a value corresponding to an overdischarge state and a value other than in the first state when the voltage at the input of the overdischarge detector raises to a voltage corresponding to an operating range;
a second directional element coupled between the second terminal and the fourth terminal of the protective circuit, the second directional element being adapted and configured to allow current flow in a second direction between the second terminal and the fourth terminal;
a second switch coupled between the second terminal and the fourth terminal of the protective circuit in parallel with the second directional element, the second switch having a control input, the second directional switch adapted and configured to block current flow between the second terminal and the fourth terminal in response to a value in a second state at the control input of the second switch; and
an overcharge detector having an input coupled between the first terminal and the fourth terminal of the protective circuit, the overcharge detector having an output coupled to the control input of the second switch, the output of the overcharge detector having a value in the second state when the voltage at the input of the overcharge detector increases above a value corresponding to an overcharge state.

13. The apparatus of claim 12, wherein each protective circuit further comprises an over-temperature detector coupled to the control input of the first switch and the control input of the second switch, the over-temperature detector adapted and configured to provide a value in the first state to the control input of the first switch and a value in the second state to the control input of the second switch when the temperature is outside an acceptable range.

14. The apparatus of claim 12, wherein the first switch comprises a p-channel FET.

15. The apparatus of claim 14, wherein second switch comprises an n-channel FET.

16. The apparatus of claim 12, wherein the first switch comprises an n-channel FET.

17. The apparatus of claim 16, wherein second switch comprises a p-channel FET.

18. The apparatus of claim 12, wherein at least a portion of the plurality of protective circuits are connected in parallel.

19. The apparatus of claim 12, wherein at least a portion of the plurality of protective circuits are connected in series.

20. The apparatus of claim 12, wherein the plurality of energy-storage devices comprise lithium cells.

21. The apparatus of claim 12, further comprising a package; and
wherein at least one of the plurality of energy-storage devices and at least one of the plurality of protective circuits is disposed within the package.

22. The apparatus of claim 12, wherein the third terminal is directly connected to the external load, the charger, and/or the second energy storage device.

23. The apparatus of claim 22, wherein the fourth terminal is directly connected to the external load, the charger, and/or the third energy storage device.

* * * * *